United States Patent Office 3,485,631
Patented Dec. 23, 1969

3,485,631
VESICULAR PHOTOGRAPHIC MATERIALS
Norman T. Notley, Deerfield, Ill., assignor to Kalvar Corporation, New Orleans, La., a corporation of Louisiana
No Drawing. Filed Nov. 17, 1966, Ser. No. 595,006
Int. Cl. G03c *1/60*
U.S. Cl. 96—75      11 Claims

ABSTRACT OF THE DISCLOSURE

A vesicular photographic material having more suitable densities for different types of light. The vehicle of the vesicular material contains a mixture of two dyes or pigments having at most only a slight overlap in absorption spectrum.

---

The present invention relates to improvements in vesicular photographic materials and more particularly to the addition of dyestuffs to vesicular photographic materials. Briefly, the invention comprises using different dyestuffs to provide different densities at different wavelengths of light.

A vesicular photographic material is a photographic film capable of forming an image with small bubbles or vesicles of gas which are generated and trapped in the areas of the film exposed to light. Generally speaking, the film comprises a colloid or resin coating, referred to as a vehicle, on a backing material and a light sensitive agent or sensitizer, most commonly a diazo compound, dispersed throughout the coating. When the film is exposed to light, the sensitizer is decomposed and releases molecules of gas (nitrogen in the case of diazo compounds). These ordinarily do not form vesicles immediately, but they do so when the film is heated, presumably because the vehicle is relaxed sufficiently on heating for the gas molecules to form bubbles and for the bubbles to expand. The bubbles reflect and scatter light and render the vehicle opaque to transmission of light in the exposed areas and they also appear white when viewed by reflected light.

It is known to include in the vehicle a relatively small amount of a light-absorbing pigment or dye such as azo oil black. This improves image contrast. The quantity of dye is insufficient to render the film opaque in the areas which do not contain bubbles. However, in the areas which contain bubbles there are numerous light-scattering centers which cause light to take an irregular path through the foil. As a result, the distance which light rays travel through the vehicle, in those areas, is many times the thickness of the vehicle, while in the unexposed areas the light path is the same as the thickness of the vehicle. The amount of light transmitted through a material is given by the equation $$I = \bar{I}_0 e^{ax}$$

where I is the intensity of the transmitted light, $I_0$ is the intensity of light incident on the material, $a$ is a constant known as the absorption coefficient which is proportional to the concentration of the pigment or dye and also depends on the nature of the pigment or dye and $x$ is the path length. In conventional photographic material, $x$ is the thickness of the light absorbing layer, i.e., the emulsion. In vesicular photographic material, it is equal to the thickness of the vehicle in unexposed areas, but in exposed areas it is the path length of light that encounters a multiplicity of scattering encounters with vesicles in the course of passing through the vehicle. In fully exposed areas having maximum density, the average number of scattering encounters is 10.

The ratio of light transmitted in the exposed areas to that transmitted in the unexposed areas is given by $$\frac{I_e}{I_u} = e^{a(\psi_u - \psi_e)}$$

where $x_u$ is the effective path length in the exposed area and $x_e$ is the vehicle thickness. It can be seen that the absorption of light by the pigment or dye in the opaque areas is greatly magnified by the light scattering centers and that very high contrast is achieved. This is of course in addition to the opaqueness difference caused by the light scattering encounters themselves. The amount of light-absorbing dye usually is less than about 5%, preferably 0.2–3%, based on the weight of the resin.

Certain difficulties are observed when a vesicular film is to be viewed or projected in more than one way because the transmission of light depends on the wavelength and other factors. This depends in part on the absorption characteristics of the dye, but also on an inherent property of vesicular film. That is, the observed density is reduced as wavelength increases. Thus, for a vesicular image with no dye the following densities are found.

| Illuminated with: | Density [1] |
|---|---|
| White light | 1.26 |
| Blue light (observed through Schott B6–12) | 1.94 |
| 3800 A. light | 2.15 |

[1] Density is the logarithm of the ratio of incident to transmitted light.

A particularly serious problem arises in graphic arts systems where a vesicular master copy might be required to print to a panchromatic silver film (cf. white light density of 1.26 above) and the same master might be required to print to another vesicular film or to a diazo sensitized plate using light at 3800 A. The high densities required for graphic arts use may be obtained only by adding large amounts of absorbing dye to the vesicular film. The addition of a dye will generally increase the film density both in the near ultraviolet and the visible, which may lead to more density than required at one wavelength. In other words, the variations in density with wavelength indicated above result from variations in refractive index with wavelength, and consequent variations in the path length and number of scattering events for various wavelengths. These factors ordinarily are not altered by adding pigment. It has been known to sometimes enhance this effect by heat treatments of the film which selectively increased the ultraviolet absorption. This was, however, a difficult procedure since increased curing tends to decrease the maximum density and increase the background density of the image.

Another problem arises when a microfilm is to be copied by contact printing. A microfilm viewer characteristically has an aperture of $f/4.5$. (The aperture is the ratio of the diameter of the opening through which the photograph is viewed to the distance from the aperture to the photograph, such that an aperture of $f:4.5$ implies that the distance is 4.5 times the diameter.) In contact printing the relative aperture is effectively $f/$zero, i.e. the light is diffused. This is known to have a very considerable effect on the effective density of the vesicular film. A film having a density with white light of 2.30 measured at $f/4.5$ was found to have a density of 0.39 by diffuse white light where the effective aperture is infinity. The discrepancy is partially offset when the projection density with white light is compared with the diffuse density with ultraviolet (here 0.44). However, a desirable value for the printing density would be around 1.0 to 1.2 and for the projection density around 2.6–2.8.

Accordingly, it is a principal object of the present invention to provide a vesicular photographic material having more suitable densities for different types of light.

Briefly stated, this is provided by introducing into the vehicle a mixture of two dyes or pigments having at most only a slight overlap in absorption spectrum. By using appropriate amounts of the respective dyes or pigments, a satisfactory adjustment of absorption characteristics in the pertinent portion of the overall spectrum is obtained.

In the vesicular sheet materials used, a wide variety of vehicles may be employed in accordance with the invention. Those preferred are dry, water-resistant, synthetic, water-insoluble, and non-water swelling polymers.

One class comprises esters, ethers and acetal derivatives of polyvinyl alcohol. The ester derivatives are generally obtained by polymerization of esters of vinyl alcohol with aliphatic or aromatic carboxylic acids. The aliphatic acids are preferred, the most suitable being lower fatty and unsaturated acids containing up to about six carbon atoms, such as acetic acid, propionic acid, valeric acid, vinyl acetic acid or crotonic acid. However, higher fatty acids such as octanoic may be used, particularly in combination with lower fatty acids. Suitable aromatic acids include benzoic acid, naphthoic acids and phenyl acetic acid. The ester polymers may be obtained from the monomer by any conventional polymerization method, i.e., bulk, solution or aqueous emulsion or dispersion, in the presence of, e.g., a free radical or ionic catalyst, the details of which form no part of the present invention.

The ether derivatives similarly may be made by polymerization of vinyl ether monomer such as vinyl alkyl ethers. Preferred materials are vinyl lower alkyl ethers containing up to six carbon atoms in the alkyl group, such as vinyl methyl ether, vinyl propyl ether, etc. As in the case of the above-described vinyl esters, any type of addition polymerization may be employed, the details of which form no part of the present invention.

Polyvinyl acetals are generally made by reaction between aldehydes and polyvinyl alcohol or polyvinyl esters such as polyvinyl acetate. It is preferred that saturated lower aliphatic aldehydes be employed containing up to six carbon atoms, particularly butyraldehyde and formaldehyde. However, small amounts of higher aliphatic aldehydes or aromatic aldehydes such as benzaldehyde may be employed.

It will be appreciated that, while the above description of preferred polymers has been directed to homopolymers, copolymers containing more than one acetal, ester or ether group may be used. Thus, polyvinyl acetals may contain two or more types of acetal groups or, e.g., acetate units as well as acetal. In addition, relatively minor amounts of other ethylenically unsaturated monomers containing one or more $>C=C<$ groups may be present in this class of preferred polymers, e.g., up to 5%, as long as the characteristics of the polymer are essentially not altered so as to render it unsuitable.

Vehicles of the aforesaid type are more fully described in Notley et al. application Ser. Nos. 403,633 and 405,597 filed Oct. 13, 1964 and Oct. 21, 1964, respectively, both applications now abandoned.

Any solid, high molecular weight polystyrene also may be used. In its preferred form, the polymer is a homopolymer or may contain minor amounts, e.g., up to 5% of other ethylenically unsaturated monomers such as methyl methacrylate. In most cases, larger amounts may be used, as long as the fundamental characteristics of the polymer are not altered so as to render it unsuitable.

Other preferred vehicles include those described in James U.S. Patent 3,032,414, Parker et al. Patents 3,161,511 and 3,251,690, Daech Patent 3,189,455 and Notley et al. application Ser. No. 463,940 filed June 14, 1965, now Patent No. 3,383,213 characterized by a permeability constant for nitrogen within the range $8.6 \times 10^{-16}$ and $8 \times 10^{-10}$, said constant being the number of cubic centimeters of nitrogen transmitted at 30° C. by an area of one square centimeter in one second when the pressure gradient is one centimeter of mercury. Such polymers include polyvinylidene chloride, polyvinyl chloride, co-polymers of vinyl chloride and vinylidene chloride, vinyl chloride and acrylonitrile, styrene and acrylonitrile, acrylonitrile and 1,1-difluoroethylene, vinylidene chloride and acrylic acid, vinyl acetate and vinylidene cyanide, vinyl chloride and acrylic acid, vinyl chloride and methyl acrylate, vinylidene chloride and ethyl acrylate, vinylidene chlorofluoride and acrylonitrile, vinylidene chloride and methyl methacrylate, vinyl acetate and vinylidene chloride, vinyl alcohol and vinylidene chloride, vinyl chloride and diethyl maleate, and vinyl chloride and vinyl acetate, ethyl cellulose, copolymers of alkyl acrylates and methacrylates with acrylonitrile, polymers of methacrylonitrile, and nylons.

Still another useful class of vesicular materials are those containing gelatin or other hydrophilic polymers and a hardening agent, as described in Parker et al. U.S. Patent 3,081,169.

The vehicles may also contain various modifiers of physical properties, as described in the above-listed patents and applications.

It will be appreciated that while numerous examples have been given, virtually any solid relatively rigid and inelastic plastic, and preferably thermoplastic, material may be used so long as it is sufficiently inelastic and rigid to retain the microscopic gas bubbles or cavities after they have formed. In many cases, softer polymers may be used if a mechanism is proivded for hardening them after the vesicles are formed. However, in view of the large number of polymeric materials which are highly satisfactory, the use of such softer materials is regarded for the most part as unnecessary.

The above polymers are substantially uniformly blendsd with a light decomposable agent, or sensitizer of the types which are known in the art of vesicular photographic materials which, upon exposure to light, decompose into products which are volatile upon warming to form the above-described radiation scattering cavities. The preferred sensitizers are non-reactive to the vehicle and, upon exposure to light, decompose into products which are chemically non-reactive to said vehicle and which are volatile to form radiation scattering discontinuities only in the light struck areas in said vehicle to thereby furnish a record. Of these preferred sensitizers, those which are especially useful are of the type which decompose to release nitrogen on exposure to light, particularly the diazonium salts. Suitable sensitizers include the diazo compounds which release nitrogen on exposure to light, as disclosed in U.S. Patents 3,032,414, 2,923,703 and 2,976,145, for example, p-diazo diphenylamine sulfate, p-diazo diethylaniline zine chloride, p-diazo ethyl hydroxyethylaniline zinc chloride,p-diazo ethyl methyl aniline zinc chlorde, p-diazo diethyl methyl aniline zinc chloride, p-diazo ethyl hydroxyethylaniline zinc chloride, 1-diazo-2-oxy naphthaline-4-sulfonate, p-diethyl amino benzene diazonium chloride ZnCl$_2$, 4-benzolamino-2-5-diethoxy benzene diazonium chloride, p-chlorobenzene-sulfonate of 4-diazo-1-cyclohexylaniline, p-chlorobenzene-sulfonate of 4-diazo-2-methoxy-1-cyclohexylamino benzene, tin chloride double salt of 4-N-methylcyclohexyl-amino-benzene diazonium chloride, p-acetamino benzene diazonium chloride, p-dimethylamino benzene diazonium chloride, 3-methyl-4-diethyl amino benzene diazonium chloride, 4-morpholino benzene diazonium chloride, 4-piperidyl-2, 5-diethoxy benzene diazonium chloride, 1-dimethyl amino naphthaline-4-diazonium chloride, p-phenyl amino diazo benzene diazonium chloride. Other useful sensitizers are those disclosed in British specification 956,336 published Apr. 22, 1964 and having the general formula

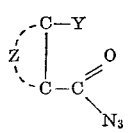

in which Y represents hydroxyl, amino, alkylamine, arylamine, or mercapto and Z represents the atoms necessary to form a cyclic structure, and those disclosed in French Patent 1,281,905 having the general structure.

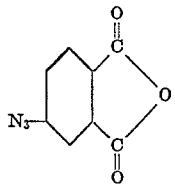

The amount of sensitizer will be 5.0 to 20.0%, based on the weight of the vehicle, preferably 10.0 to 16.0%.

The pigments or dyes, hereinafter referred to as light absorbers, will be designated A and B.

The light absorber A is substantially opaque to light in the range 3600 to 4000 A. That is, when a sample coating ⅓ mil thick is made containing the vehicle and 10% of said light absorber by weight of the vehicle the sample should absorb at least about 25% of incident light in that frequency range. In addition, the material should be substantially transparent to visible light in the range 4500–7000 A., i.e. the sample described above should absorb at most about 5% of light in that range.

Numerous ultraviolet absorbers are known which satisfy these requirements. One particularly useful class is disclosed in Heller U.S. Patent 3,004,896 and comprises compounds having the formula

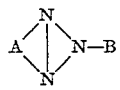

where A represents a phenylene radical bound by two neighboring carbon atoms to two nitrogen atoms of the triazole ring and B represents a phenyl radical substituted by groups not imparting strong coloration. Typical compounds are 2-(2' hydroxy-5'-methylphenyl)-benztriazole and 2-(2' hydroxy-5'-methylphenyl)-benztriazole-5-carboxylic acid butylester. A second particularly useful class comprises 2-hydroxy benzophenones as disclosed for instance in U.S. Patent 2,972,597. Particularly useful examples include 2-hydroxy-4-(2 hydroxy-3-methacryloxypropoxy) benzophenone and 2-hydroxy-4-methoxy benzophenone. A third class comprises phenyl salicylates as disclosed for instance in U.S. Patent 3,033,814, such as p-tertiary butylphenyl salicylate. Also useful is Latyl Yellow (Colour Index Disperse Yellow 42). This absorbs a little visible light and is not as suitable as other compounds which do not. However, it is useful.

The light absorber B is substantially opaque to light in the range 4500–7000 A. and is substantially transparent to ultraviolet in the range 3600–4000 A. That is, a sample coating is prepared at ⅓ mil thick containing the vehicle and 10% of light absorber B by weight of the vehicle, and the sample should absorb at least about 25% of light in the range 4500–7000 A. and should absorb no more than about 5% in the range 3600–4000 A. A particularly useful material is Latyl Blue LS (Colour Index Disperse Blue 62).

The absorptions for light absorbers A and B described above are average values based on samples illuminated with light having substantially uniform intensity throughout the respective ranges. This is a practical measurement since light sources used to view, print and project vesicular photographic materials usually will be of this type. Therefore, it is not necessary for the light absorbers to have uniform absorption throughout the respective ranges. Actually, for light absorber B, it is desirable to use a blue dye which absorbs proportionately more red light. This compensates for a natural tendency of vesicular photographs to appear pink. In certain special cases, where unusual lighting is to be used for viewing the vesicular photographs, for example monochromatic light, the light absorber may be selected so that it will have the aforesaid minimum and maximum absorptions at the wavelength of the light used, in addition to satisfying the above average requirements.

The amount of each light absorber is about 0.001% up to 10%, by weight of said vehicle depending on its absorption characteristics. Ordinarily, one does not want either too little or too much absorption. If there is too much, there are difficulties in dissolving it when a film is made and unexposed areas of the film may lose too much transmission. Therefore, it is preferred that each light absorber reduce average light transmissions in the film about 20–50% in its respective region of absorption.

The vehicle, sensitizer and light absorber may be combined by any suitable method. However, it is preferred that the resin and sensitizer, and preferably also the light absorbers each be dissolved in a solvent and the resultant solutions combined, since this provides a highly uniform distribution of sensitizer in the polymer. In this embodiment it is only necessary that the respective solvents be mutually miscible. For the most part, polar solvents will be used such as alcohols, ketones, nitriles, esters, ethers and halogenated solvents. Particularly useful are methyl, ethyl and isopropyl alcohols, alkyl acetates, acetone, methyl ethyl ketone, dioxane and acetonitrile. However, any inert solvent which meets the above miscibility requirements may be used.

The solution obtained is coated on any suitable backing layer, either transparent or opaque, such as glass, paper, Mylar (oriented polyethylene terephthalate film), polyethylene film or polypropylene film as disclosed in U.S. Patents 2,950,194 and 3,037,862. The solutions are dried by evaporation and the films are ready for use. The dry coating thickness is about .05 to .90 mil, preferably .15 to .70 mil.

After the film is thus prepared, there are at least three different known methods of processing it. In one form, the film is exposed to image forming light, e.g., by being placed in contact with a transparency, and exposed to light passing through the transparency, then the film is heated to 160–300° F. for ⅒ to 3 seconds. This will produce an image of the opposite photographic sign from the transparency. Thus if the transparency is negative, a positive vesicular photograph will result.

A second processing system which can be used is that described in U.S. Patent 2,911,299. In it, the film is exposed to image forming light and gas released by the sensitizer is allowed to diffuse from the vehicle at a temperature too low for development to take place. Then the film is exposed overall to uniform light which actuates undecomposed sensitizer, and it is heated to cause development at 160–300° F. for ⅒ to 3 seconds either during or shortly after the second exposure, but before the gas has substantially diffused from the film. This results in image formation in areas not originally struck by light and an image of the same photographic sign as the transparency. Thus a negative transparency results in the formation of a negative vesicular photograph which might be called a reversal image or a direct image.

The third processing system is that described in U.S. application Ser. No. 383,169 filed July 16, 1964, now abandoned. In that system, the film is exposed to image forming light of relatively low intensity for at least about 0.5 second and preferably for at least about 2.0 seconds. That is, the light is of low enough intensity that the film does not receive a normal exposure in less than 0.5 second and preferably 2.0 seconds. Then the film receives an overall exposure of light intensity which is sufficient to expose the film in less than 0.2 second and preferably less than 0.01 second. Overexposure or longer exposure can be tolerated, but there must be sufficient light to properly expose the film during the indicated time. This procedure avoids a separate diffusion step as used in the method of U.S. Patent 2,911,299. In some cases, no heating is required to cause development, and the image appears spontaneously. However, in other cases, some heating may be used to advantage, as more fully described in application Ser. No. 383,169.

The invention is illustrated by the following examples, all parts being by weight unless otherwise indicated.

EXAMPLE I

This example relates to a vesicular film containing no light absorber.

The following were assembled:

| | Parts by weight |
|---|---|
| Copolymer of vinylidene chloride and acrylontrile (Saran F–120) | 17.0 |
| Polymethyl methylacrylate | 1.5 |
| p-Diazodimethylaniline zinc chloride (Edwal compound No. 8) | 1.2 |
| Methyl ethyl ketone (MEK) | 60.0 |
| Methyl alcohol | 12.0 |

The methyl alcohol was warmed to approximately 50° C. and the Edwal compound No. 8 stirred in. The resulting solution was diluted with five parts MEK and slowly added, while stirring, to a solution of the two resins, the Saran and the polymethyl methylacrylate, in the remainder of the MEK, this latter solution being likewise warmed to 50° C. The resulting solution was cast on "Mylar" coated polyester base at a thickness of 0.7 mil using a vacuum plate and a laboratory coating knife. The coated sheet was dried for thirty minutes at 95° C. and then immersed in water at 88° C. (190° F.) for 20 seconds and allowed to dry.

A sample from the coating thus produced was exposed through a standard silver step wedge to actinic radiation from a 400 watt mercury vapor arc lamp twelve inches distant for 90 seconds and developed by contact with a hot roll at 240° F. for ½ second. The resulting image showed the following properties:

| | |
|---|---|
| White light density max. | 1.3 |
| Printing density max. (UV light) | 2.1 |

The densities were measured with a Welch Densichron.

EXAMPLE II

This example illustrates the known use of pigments.

A film sample was produced as in Example I except that 0.6 part by weight of azo oil blue black was added to the formulation. A sample was exposed and developed as in Example I with the following results.

| | |
|---|---|
| White light density max. | 1.6 |
| Printing density max. | 2.6 |

As can readily be seen, in this example of the prior art, the dye induced an increase in white light density which is actually accompanied by a larger increase in printing density and the imbalance between printing and white light densities was widened.

EXAMPLE III

This example illustrates the present invention.

A film sample was produced as in Example I except that 1.2 parts by weight of Latyl Blue LS dye (Colour Index Disperse Blue 62) and 0.2 part by weight of Uvinol 400, a UV absorber were added to the formulation. A sample was exposed and developed as in Example I with the following results:

| | |
|---|---|
| White light density $D_{max}$ | 2.1 |
| Printing density $D_{max}$ | 2.6 |

The density towards a panchromatic silver film (white light density) and the density towards a vesicular film or towards a diazo sensitized printing plate are now more nearly equal.

I claim:

1. In a vesicular photographic film comprising a polymeric vehicle having uniformly dispersed therein a light decomposable agent which upon exposure to light decomposes into products which are chemically non-reactive to the vehicle and which are volatile on warming to form radiation scattering discontinuities only in light struck areas in the vehicle;

the improvement wherein there are also uniformly distributed in said vehicle a light absorbing material A and a light absorbing material B, said light absorbing material A being substantially opaque to light of wavelength 3600–4000 Angstrom units and substantially transparent to light of wavelength 4500–7000 Angstrom units, and said light absorbing material B being substantially opaque to light by wavelength 4500–7000 Angstrom units and substantially transparent to light of wavelength 3600–4000 Angstrom units, said light decomposable agent neither being the said light absorbing material A nor the said light absorbing material B.

2. A vesicular photographic material as set forth in claim 1 in which the absorbing of light by said light absorbing material A is such that a coating ⅓ mil thick comprising the vehicle and 10% of said light absorbing material A absorbs at least 25% of light in the range 3600–4000 Angstrom units and at most 5% of light in the range 4500–7000 Angstrom units, the percent of light absorbing material being based on the weight of said vehicle.

3. A vesicular photographic material as set forth in claim 1 in which the absorption of light by said light absorbing material B is such that a coating ⅓ mil thick comprising the vehicle and 10% of said light absorbing material B absorbs at least 25% of light in the range 4500–7000 Angstrom units and at most 5% of light in the range 3600–4000 Angstrom units, the percent of said light absorbing material B being based on the weight of said vehicle.

4. A vesicular photographic material as set forth in claim 1 in which the amount of each light absorber is about 0.001 to about 10% by weight of said vehicle.

5. A vesicular photographic material as set forth in claim 1 in which said vehicle comprises a mixture of a polymethyl methacrylate and a copolymer of vinylidene chloride and acrylonitrile.

6. A vesicular photographic material as set forth in claim 1 in which said vehicle comprises a polyvinyl acetal.

7. A vesicular photographic material as set forth in claim 1 in which said light decomposable agent comprises a diazo compound.

8. A vesicular photographic material as set forth in claim 7, in which said light decomposable agent is p-diazo -N,N-dimethylaniline zinc chloride double salt.

9. A vesicular photographic material having approximately the same density to light of wavelength 3600 to 4000 Angstrom units and light of 4500–7000 Angstrom units comprising a polymeric vehicle, a light decomposable agent uniformly dispersed in said vehicle, said agent decomposing, on exposure to light, into products which are chemically non-reactive to said vehicle and which are volatile on warming to form radiation scattering discontinuities, about 0.001 to 10% by weight of said vehicle of a light absorbing material A and about 0.001 to about 10% by weight of said vehicle of a light absorbing material B, the absorption of light by said light absorbing material A being such that a coating ⅓ mil thick comprising the vehicle and 10% of light absorbing material A absorbs at least 25% of light in the range 3600–7000 Angstrom units and at most 5% of light in the range 4500–7000 Angstrom units, the percentage of said light absorbing material A in said ⅓ mil coating being based on the weight of the vehicle in said ⅓ mil thick coating, and the absorption of light by said light absorbing material B being such that a coating ⅓ mil thick comprising the vehicle and 10% based on the weight of the vehicle of said light absorbing material B absorbs at least 25% of light in the range 4500–7000 Angstrom units and at most 5% of light in the range 3600–4000 Angstrom units, the percentage of said light absorbing material B in said ⅓ mil coating being based on the weight of vehicle in said ⅓ mil coating, said light decomposable agent neither being the said light absorbing material A nor the said light absorbing material B.

10. A vesicular photographic film as set forth in claim 1 wherein said light decomposable agent is p-diazodimethylaniline zinc chloride.

11. A vesicular photographic film as set forth in claim 9 in which said light decomposable agent is p-diazodimethylaniline zinc chloride.

References Cited

UNITED STATES PATENTS

| 2,322,982 | 6/1943 | Von Poser | 96—91 |
| 2,908,572 | 10/1959 | Schoen et al. | 96—75 XR |
| 3,032,414 | 5/1962 | James et al. | 96—91 |
| 3,260,599 | 7/1966 | Lokken | 96—91 XR |

FOREIGN PATENTS 645,825  11/1950  Great Britian.

OTHER REFERENCES

Landau et al.: "Diazo Compounds in the Photocopying Industry," The Journal of Photo Science, vol. 13, 1965 (p. 145 relied on).

NORMAN G. TORCHIN, Primary Examiner

C. BOWERS, Assistant Examiner

U.S. Cl. X.R.

96—27, 48, 49, 67, 88, 91, 115